United States Patent
Ali et al.

(10) Patent No.: US 11,873,010 B2
(45) Date of Patent: Jan. 16, 2024

(54) ENERGY MANAGEMENT SYSTEM FOR AN ELECTRIC AUTONOMOUS VEHICLE, AND A METHOD OF OPERATING THE SAME

(71) Applicant: GM Global Technology Operations LLC, Detroit, MI (US)

(72) Inventors: Kamran Ali, Troy, MI (US); Donald K. Grimm, Utica, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 226 days.

(21) Appl. No.: 17/545,189

(22) Filed: Dec. 8, 2021

(65) Prior Publication Data

US 2023/0174108 A1 Jun. 8, 2023

(51) Int. Cl.
*B60W 60/00* (2020.01)
*B60L 15/20* (2006.01)
*B60W 50/12* (2012.01)

(52) U.S. Cl.
CPC ..... *B60W 60/0023* (2020.02); *B60L 15/2045* (2013.01); *B60W 50/12* (2013.01); *B60L 2240/64* (2013.01); *B60L 2240/66* (2013.01); *B60L 2240/665* (2013.01); *B60L 2240/68* (2013.01); *B60W 2552/00* (2020.02); *B60W 2554/40* (2020.02); *B60W 2555/20* (2020.02); *B60W 2556/45* (2020.02)

(58) Field of Classification Search
CPC ............ B60W 60/0023; B60W 50/12; B60W 2552/00; B60W 2556/45; B60W 2555/20; B60W 2554/40; B60L 15/2045; B60L 2240/64; B60L 2240/66; B60L 2240/665; B60L 2240/68
See application file for complete search history.

(56) References Cited

U.S. PATENT DOCUMENTS

2009/0088914 A1* 4/2009 Mizutani ............... B60K 17/356
                                                      180/65.265
2016/0009269 A1* 1/2016 Zhou ....................... B60K 6/442
                                                      180/65.23

(Continued)

FOREIGN PATENT DOCUMENTS

CN                107585222 B   *   7/2023

*Primary Examiner* — Behrang Badii
*Assistant Examiner* — Jay Khandpur
(74) *Attorney, Agent, or Firm* — Vivacqua Crane PLLC

(57) ABSTRACT

An energy management system for an electric autonomous vehicle comprises a battery and a controller comprising a processor and a non-transitory computer-readable medium. The system comprises a pre-allocation input mechanism transmitting an input signal to the processor relating to a travel destination for the vehicle. The system comprises a navigation module receiving a wireless signal from a satellite network relating to a current location of the vehicle. The system comprises an autonomous input mechanism powered by the battery and transmitting an autonomous signal to the processor relating to dynamic conditions for autonomous operation of the vehicle. The processor determines a route between the current location and the travel destination, performs autonomous operation of the vehicle along the route, and selectively powers or tunes the usage of the at least one autonomous input mechanism with the battery during autonomous operation of the vehicle.

17 Claims, 2 Drawing Sheets

(56) References Cited

U.S. PATENT DOCUMENTS

| | | | |
|---|---|---|---|
| 2016/0193937 A1* | 7/2016 | Dalum | B60W 50/0097 903/903 |
| 2020/0117204 A1* | 4/2020 | Lindemann | B60W 60/0023 |
| 2022/0126851 A1* | 4/2022 | Lu | B60W 50/16 |
| 2023/0166601 A1* | 6/2023 | Schneider | B60L 7/26 701/70 |

* cited by examiner

ENERGY MANAGEMENT SYSTEM FOR AN
ELECTRIC AUTONOMOUS VEHICLE, AND
A METHOD OF OPERATING THE SAME

INTRODUCTION

The present disclosure relates to an electric autonomous vehicle, and more particularly to an energy management system for an electric autonomous vehicle.

In recent years, the use of electric motors to power vehicles has increased exponentially. Autonomous vehicle operation has also expanded rapidly, including in electric vehicles. While the adoption of autonomy in electric vehicles has significant consumer benefits (including safety and comfort), the components used to operate the vehicle autonomously consume significant amounts of power from the vehicle's battery. The range of an electric vehicle between required charging events are of concern to most consumers. As such the additional power consumption required to operate the vehicle autonomously further reduces the range of the electric vehicle.

Thus, there is a need for an energy management system that addresses these issues.

SUMMARY

According to several aspects of the present disclosure, an energy management system for an electric autonomous vehicle comprises a battery and a controller comprising at least one processor and at least one non-transitory computer-readable medium including instructions. The energy management system further comprises a pre-allocation input mechanism in electronic communication with the processor and arranged to transmit an input signal to the processor relating to a travel destination for the vehicle corresponding to manipulation of the pre-allocation input mechanism by an operator. The energy management system further comprises a navigation module in electronic communication with the processor and configured to receive a wireless signal from a satellite network relating to a current location of the vehicle. The energy management system further comprises at least one autonomous input mechanism powered by the battery and in electronic communication with the processor, with the at least one autonomous input mechanism arranged to transmit an autonomous signal to the processor relating to dynamic conditions for autonomous operation of the vehicle. The processor is programmed to determine a route between the current location and the travel destination, perform autonomous operation of the vehicle along the route, and selectively power or tune the usage of the at least one autonomous input mechanism with the battery during autonomous operation of the vehicle based upon need of the autonomous signal along the route to conserve energy in the battery.

In one aspect, the processor is further programmed to assign at least one scenario along the route. The processor programmed to selectively power or tune the usage of the at least one autonomous input mechanism with the battery during autonomous operation of the vehicle based upon need of the autonomous signal along the route to conserve energy in the battery is further defined as the processor being programmed to reduce power to the at least one autonomous input mechanism with the battery during autonomous operation of the vehicle within the at least one scenario along the route to conserve energy in the battery.

In another aspect, the at least one scenario is defined along a portion of the route.

In another aspect, the at least one scenario is defined by driving conditions embedded within the wireless signal from the satellite network.

In another aspect, the driving conditions are further defined as at least one of maneuver complexity, route complexity, road quality indication, congestion awareness, weather conditions, and lighting conditions.

In another aspect, the processor is programmed to reduce power to the at least one autonomous input mechanism with the battery because the at least one autonomous input mechanism is not necessary for autonomous operation based on the driving conditions within the at one scenario.

In another aspect, the at least one autonomous input mechanism is defined as at least one of a camera, a radar, and a lidar.

In another aspect, the at least one autonomous input mechanism is defined as a plurality of autonomous input mechanisms and the at least one scenario is further defined as a plurality of scenarios along the route, with the autonomous input mechanisms configured to individually be powered off or usage be tuned during one or more of the scenarios.

In another aspect, the processor is further programmed to selectively power or tune the usage of the navigation module with the battery during autonomous operation of the vehicle based upon need of the wireless signal along the route to conserve energy in the battery.

In another aspect, the processor being programmed to reduce power to the at least one autonomous input mechanism with the battery during autonomous operation of the vehicle within the at least one scenario along the route is arranged to be overridden by an input from at least one of the operator and a remote assistance network.

According to several aspects of the present disclosure, a method of operating an energy management system for an electric autonomous vehicle is presented. The energy management system comprises a battery, a controller comprising at least one processor and at least one non-transitory computer-readable medium including instructions, a pre-allocation input mechanism in electronic communication with the processor, a navigation module in electronic communication with the processor, and at least one autonomous input mechanism powered by the battery and in electronic communication with the processor. The at least one autonomous input mechanism is arranged to transmit an autonomous signal to the processor relating to dynamic conditions for autonomous operation of the vehicle. The method comprises manipulating the pre-allocation input mechanism by an operator, transmitting an input signal from the pre-allocation input mechanism to the processor relating to a travel destination for the vehicle, receiving a wireless signal from a satellite network relating to a current location of the vehicle, determining a route between the current location and the travel destination, performing autonomous operation of the vehicle along the route, and selectively powering or tuning the usage of the at least one autonomous input mechanism with the battery during autonomous operation of the vehicle based upon need of the autonomous signal along the route to conserve energy in the battery.

In one aspect, the method further comprises assigning at least one scenario along the route. Selectively powering or tuning the usage of the at least one autonomous input mechanism with the battery during autonomous operation of the vehicle based upon need of the autonomous signal along the route to conserve energy in the battery is further defined as reducing power to the at least one autonomous input mechanism with the battery during autonomous operation of the vehicle within the at least one scenario along the route to conserve energy in the battery.

In another aspect, the at least one scenario is defined along a portion of the route.

In another aspect, the at least one scenario is defined by driving conditions embedded within the wireless signal from the satellite network.

In another aspect, the driving conditions are further defined as at least one of maneuver complexity, route complexity, road quality indication, congestion awareness, weather conditions, and lighting conditions.

In another aspect, reducing power to the at least one autonomous input mechanism with the battery is further defined as reducing power to the at least one autonomous input mechanism with the battery because the at least one autonomous input mechanism is not necessary for autonomous operation based on the driving conditions within the at one scenario.

In another aspect, the at least one autonomous input mechanism is defined as a plurality of autonomous input mechanisms and the at least one scenario is further defined as a plurality of scenarios along the route, with the autonomous input mechanisms configured to individually be powered off during one or more of the scenarios.

In another aspect, the method further comprises selectively powering or tuning the usage of the navigation module with the battery during autonomous operation of the vehicle based upon need of the wireless signal along the route to conserve energy in the battery.

In another aspect, the method further comprises overriding reducing power to the at least one autonomous input mechanism with the battery by an input from at least one of the operator and a remote assistance network.

According to several aspects of the present disclosure, a method of operating an energy management system for an electric autonomous vehicle is presented. The energy management system comprises a battery, a controller comprising at least one processor and at least one non-transitory computer-readable medium including instructions, a pre-allocation input mechanism in electronic communication with the processor, a navigation module in electronic communication with the processor, and at least one autonomous input mechanism powered by the battery and in electronic communication with the processor. The at least one autonomous input mechanism is arranged to transmit an autonomous signal to the processor relating to dynamic conditions for autonomous operation of the vehicle. The method comprises manipulating the pre-allocation input mechanism by an operator, transmitting an input signal from the pre-allocation input mechanism to the processor relating to a travel destination for the vehicle, receiving a wireless signal from a satellite network relating to a current location of the vehicle, determining a route between the current location and the travel destination, assigning at least one scenario along the route, performing autonomous operation of the vehicle along the route, reducing power to the at least one autonomous input mechanism with the battery during autonomous operation of the vehicle within the at least one scenario along the route to conserve energy in the battery, and overriding reducing power to the at least one autonomous input mechanism with the battery by an input from at least one of the operator and a remote assistance network.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
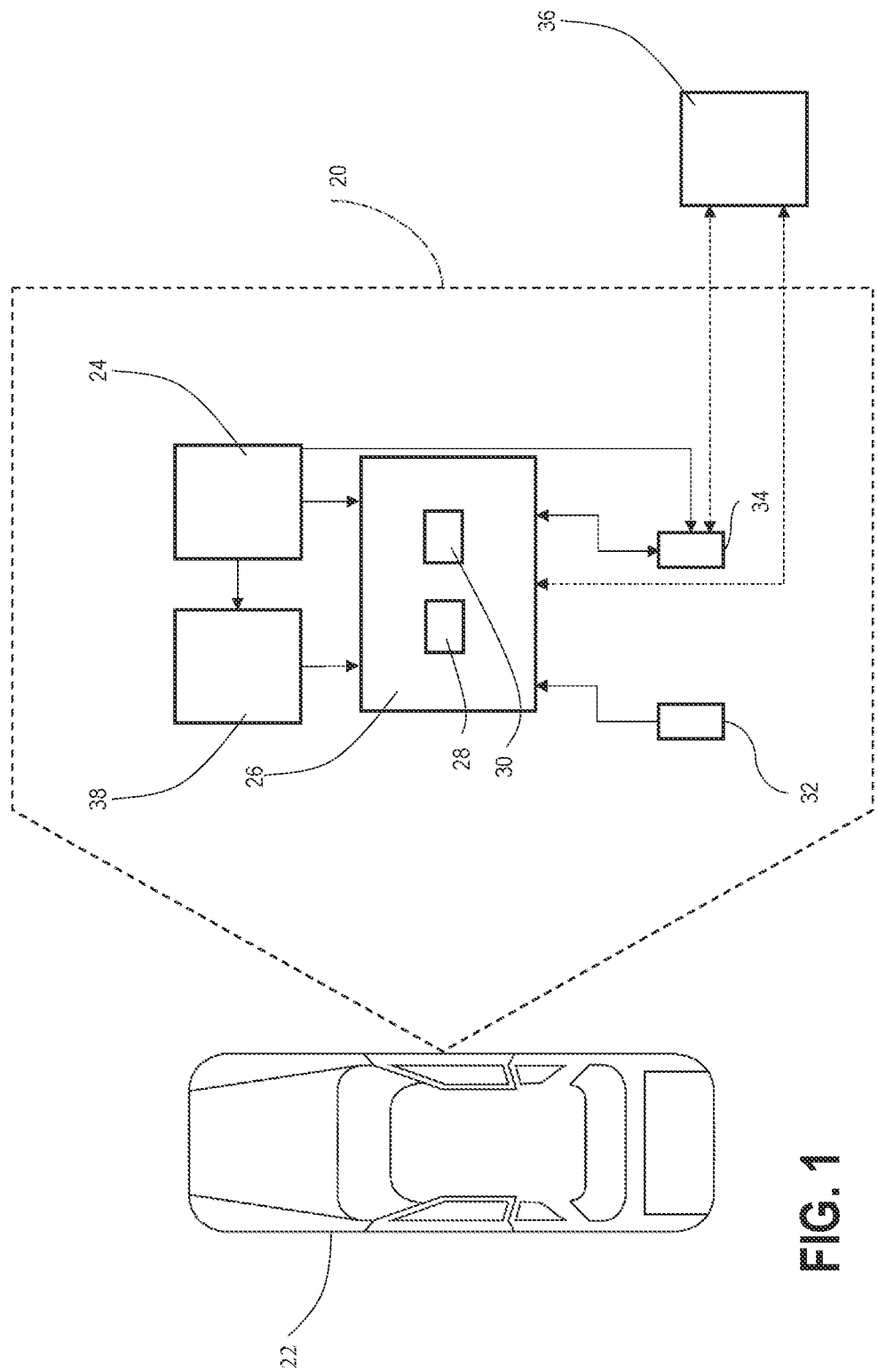
FIG. 1 is a schematic view of one example of an electric vehicle having an energy management system.

Referring to FIG. 1, according to several aspects of the present disclosure, an energy management system 20 of an electric autonomous vehicle 22 is generally shown. The energy management system 20 comprises a battery 24. In the example shown in the Figures, the battery 24 is the vehicle battery 24 which powers the entire vehicle 22. However, the battery 24 may be specialized to power only the energy management system 20. The energy management system 20 further comprises a controller 26 comprising at least one processor 28 and at least one non-transitory computer-readable medium 30 including instructions. The at least one non-transitory computer-readable medium 30 may include other data such as control logic, software applications, instructions, computer code, data, lookup tables, etc. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. The non-transitory computer readable medium 28 may include media where data can be permanently stored and media where data can be stored and later overwritten, such as a rewritable optical disc or an erasable memory device. Computer code includes any type of program code, including source code, object code, and executable code. The processor 28 is configured to execute the code or instructions. The at least one processor 28 may comprise a single processor. Alternatively, numerous processors may be utilized, including (but not limited to) a vehicle context manager, a vehicle attention manager, and a decision-making processor.

The energy management system 20 further comprises a pre-allocation input mechanism 32 in electronic communication with the processor 28 and arranged to transmit an input signal to the processor 28 relating to a travel destination for the vehicle 22 corresponding to manipulation of the pre-allocation input mechanism 32 by an operator. The energy management system 20 further comprises a navigation module 34 in electronic communication with the processor 28 and configured to receive a wireless signal from a satellite network 36 relating to a current location of the vehicle 22. The energy management system 20 further comprises at least one autonomous input mechanism 38 powered by the battery 24 and in electronic communication with the processor 28, with the at least one autonomous input mechanism 38 arranged to transmit an autonomous signal to the processor 28 relating to dynamic conditions for autonomous operation of the vehicle 22. The processor 28 is programmed to determine a route between the current location and the travel destination, perform autonomous operation of the vehicle 22 along the route, and selectively power or tune the usage of the at least one autonomous input mechanism 38 with the battery 24 during autonomous operation of the vehicle 22 based upon need of the autonomous signal along the route to conserve energy in the battery 24. More specifically, the processor 28 may shut down certain aspects of the control system 20 (such as the at least one autonomous input mechanism 38) along certain parts of the route that are not necessary for autonomous operation of the vehicle 22 in order to conserve the energy within the battery 24 to extend the overall range that the vehicle 22 may travel before recharging.

The processor 28 may be further programmed to assign at least one scenario along the route. The processor 28 being programmed to selectively power or tune the usage of the at least one autonomous input mechanism 38 with the battery 24 during autonomous operation of the vehicle 22 based upon need of the autonomous signal along the route to conserve energy in the battery 24 is further defined as the processor 28 being programmed to reduce powering the at least one autonomous input mechanism 38 with the battery 24 during autonomous operation of the vehicle 22 within the at least one scenario along the route to conserve energy in the battery 24. This reduction in power may be obtained by completely shutting off power to the at least one autonomous input mechanism 38. Alternatively, the reduction in power may be obtained by reducing the functionality of the at least one autonomous input mechanism 38, which is described in greater detail below. The at least one scenario may be defined along a portion of the route. Alternatively, the at least one scenario may be defined along the entire route.

The at least one scenario may be defined by driving conditions embedded within the wireless signal from the satellite network 36. Furthermore, the at least one scenario may be embedded within any wireless network, including long/short range wireless communications such as cellular and peer-to-peer networking. The driving conditions may be further defined as at least one of maneuver complexity, route complexity, road quality indication, congestion awareness, weather conditions, and lighting conditions. However, the driving conditions may include other conditions not explicitly listed herein. The driving conditions may be obtained remotely from a remote edge and/or cloud-based server (e.g., through the satellite network 36). The processor 28 is programmed to reduce power to the at least one autonomous input mechanism 38 with the battery 24 because the at least one autonomous input mechanism 38 is not necessary for autonomous operation based on the driving conditions within the at one scenario. For example, the at least one autonomous input mechanism 38 may be defined as at least one of a camera, a radar, and a lidar. It is to be appreciated that the at least one autonomous input mechanism 38 may comprise other devices and sensors not explicitly described herein that are utilized for autonomously operating the vehicle. Examples of scenarios which may reduce the power to the at least one autonomous input mechanism 38 include an intersection stop, a long highway without significant maneuver changes, drive-through lines, the vehicle 22 being turned on but parked, an oncoming emergency vehicle stop, low vehicle speed (i.e., higher speed requires higher alertness), dimming/brightening of lights, and traffic congestion. These exemplary scenarios require reduced alertness from the control system 20. In at least some of these scenarios, the resolution, the field of view, and the frames per second of the camera may be reduced. In at least some of these scenarios, the range/signal strength, the field of view, and the cycle time of the radar and/or the lidar may be reduced. Furthermore, GPS services through the navigation module 34 may be reduced in accuracy and or turned off in at least some of these scenarios. Additionally, short-range wireless vehicle communications (e.g., vehicle to vehicle communication, vehicle to infrastructure communication, and vehicle to passenger communication) may be reduced or disabled in at least some of these scenarios. Furthermore, suspension control may be reduced on a rough road (i.e., as a trade-off between comfort and battery life).

The at least one autonomous input mechanism 38 may be defined as a plurality of autonomous input mechanisms 38 and the at least one scenario may be further defined as a plurality of scenarios along the route, with the autonomous input mechanisms 38 configured to individually be powered off during one or more of the scenarios. As such, numerous autonomous input mechanisms 38 (including one or more camera, lidar, radar, etc.) may have conditions changed to reduce power consumption on the route at the various scenarios. One or more autonomous input mechanisms 38 may experience condition changes at any given scenario.

The processor 28 may be further programmed to selectively power or tune the usage of the navigation module 34 with the battery 24 during autonomous operation of the vehicle 22 based upon need of the wireless signal along the route to conserve energy in the battery 24. More specifically, as described above certain scenarios such as a long road with minimal maneuver changes require reduced GPS input. As such, power to the navigation module 34 is reduced.

In addition to the reduced power to the various autonomous input mechanisms 38, power is also reduced to the controller 26 itself as less processing occurs due to the reduced data input to the processor 28.

The processor 28 being programmed to reduce power to the at least one autonomous input mechanism 38 with the battery 24 during autonomous operation of the vehicle 22 within the at least one scenario along the route is arranged to be overridden by an input from at least one of the operator and a remote assistance network. The remote assistance network may comprise a person and/or an artificial intelligence system that may make a decision that overrides the processor 28. For example, the remote assistance network may tell the vehicle 22 to park in a safe location in the event of a safety concern, rather than follow the route with the various scenarios. As another example, the operator may choose to maintain desired suspension controls in rough road conditions, prioritizing comfort over energy savings.

Figure 2:
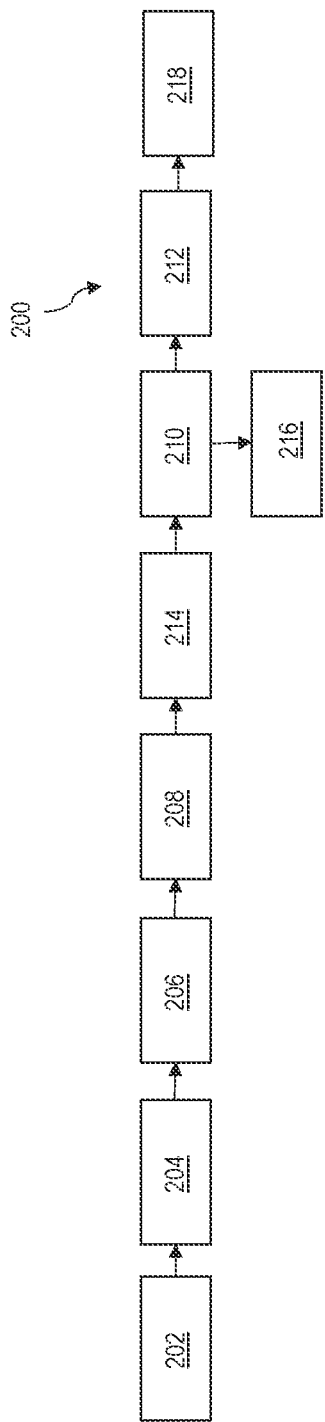
FIG. 2 is a flow chart showing a method of operating the energy management system.

A method 200 of operating the energy management system 20 is also disclosed herein and shown in FIG. 2. The method comprises manipulating the pre-allocation input mechanism 32 by the operator (see box 202), transmitting the input signal from the pre-allocation input mechanism 32 to the processor 28 relating to the travel destination for the vehicle 22 (see box 204), receiving the wireless signal from the satellite network 36 relating to the current location of the vehicle 22 (see box 206), and determining the route between the current location and the travel destination (see box 208). The method further comprises performing autonomous operation of the vehicle 22 along the route (see box 210), and selectively powering or tuning the usage of the at least one autonomous input mechanism 38 with the battery 24 during autonomous operation of the vehicle 22 based upon need of the autonomous signal along the route to conserve energy in the battery 24 (see box 212).

The method may further comprise assigning the at least one scenario along the route (see box 214). Selectively powering or tuning the usage of the at least one autonomous input mechanism 38 with the battery 24 during autonomous operation of the vehicle 22 based upon need of the autonomous signal along the route to conserve energy in the battery 24 (see box 212) may be further defined as reducing power to the at least one autonomous input mechanism 38 with the battery 24 during autonomous operation of the vehicle 22 within the at least one scenario along the route to conserve energy in the battery 24. The at least one scenario may be defined along the portion of the route. Furthermore, the at least one scenario may be defined by driving conditions embedded within the wireless signal from the satellite network 36. As described above, the driving conditions may be further defined as at least one of the maneuver complexity, the route complexity, the road quality indication, the congestion awareness, the weather conditions, and the lighting conditions.

Reducing power to the at least one autonomous input mechanism 38 with the battery 24 (see box 212) may be further defined as reducing power to the at least one autonomous input mechanism 38 with the battery 24 because the at least one autonomous input mechanism 38 is not necessary for autonomous operation based on the driving conditions within the at one scenario. Furthermore, the at least one autonomous input mechanism 38 may be defined as the plurality of autonomous input mechanisms 38 and the at least one scenario may be further defined as the plurality of scenarios along the route, with the autonomous input mechanisms 38 configured to individually be powered off during one or more of the scenarios.

The method may further comprise selectively powering or tuning the usage of the navigation module 34 with the battery 24 during autonomous operation of the vehicle 22 based upon need of the wireless signal along the route to conserve energy in the battery 24 (see box 216). Additionally, the method may further comprise overriding reducing power to the at least one autonomous input mechanism 38 with the battery 24 by an input from at least one of the operator and the remote assistance network (see box 218.

Accordingly, the supervisory computer 28, the energy management system 20, and the corresponding method 200 offer several advantages. The energy management system 20 reduces the power consumed for autonomous operation of the vehicle 22. As such, the range of the vehicle is improved, reducing "range-anxiety" felt by the operator.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An energy management system for an electric autonomous vehicle, comprising;
   a battery;
   a controller comprising at least one processor and at least one non-transitory computer-readable medium including instructions;
   a pre-allocation input mechanism in electronic communication with the processor and arranged to transmit an input signal to the processor relating to a travel destination for the vehicle corresponding to manipulation of the pre-allocation input mechanism by an operator;
   a navigation module in electronic communication with the processor and configured to receive a wireless signal from a satellite network relating to a current location of the vehicle;
   at least one autonomous input mechanism powered by the battery and in electronic communication with the processor, wherein the at least one autonomous input mechanism is one of a camera, lidar, or radar, and with the at least one autonomous input mechanism arranged to transmit an autonomous signal to the processor relating to dynamic conditions for autonomous operation of the vehicle;
   wherein the processor is programmed to:
      determine a route between the current location and the travel destination;
      assign at least one scenario along the route, wherein the at least one scenario is defined as a maneuver complexity, a route complexity, a road quality indication, a congestion awareness, a weather condition, and a lighting condition;
      perform autonomous operation of the vehicle along the route; and
      selectively reduce usage of the at least one autonomous input mechanism to reduce power consumption with the battery during autonomous operation of the vehicle while operating along the route in the at least one scenario based upon need of the autonomous signal along the route to autonomously operate the vehicle based on the maneuver complexity, the route complexity, the road quality indication, the congestion awareness, the weather condition, or the lighting condition.

2. The energy management system of claim 1, wherein reducing usage to the at least one autonomous input mechanism includes reducing a resolution, a field of view, and a frames per second of the camera, and reducing a range/signal strength, a field of view, and a cycle time of the radar and/or the lidar.

3. The energy management system of claim 1, wherein the at least one scenario is defined along a portion of the route.

4. The energy management system of claim 3, wherein the at least one scenario is defined by driving conditions embedded within the wireless signal from the satellite network.

5. The energy management system of claim 1, wherein the processor is programmed to reduce power to the at least one autonomous input mechanism with the battery because the at least one autonomous input mechanism is not necessary for autonomous operation based on the driving conditions within the at least one scenario.

6. The energy management system of claim 1, wherein the at least one autonomous input mechanism is defined as a plurality of autonomous input mechanisms and the at least one scenario is further defined as a plurality of scenarios along the route, with the autonomous input mechanisms configured to individually be powered off during one or more of the scenarios.

7. The energy management system of claim 1, wherein the processor is further programmed to selectively power or tune the usage of the navigation module with the battery during autonomous operation of the vehicle based upon need of the wireless signal along the route to conserve energy in the battery.

8. The energy management system of claim 1, wherein the processor being programmed to reduce power to the at least one autonomous input mechanism with the battery during autonomous operation of the vehicle within the at least one scenario along the route is arranged to be overridden by an input from the operator and a remote assistance network.

9. A method of operating an energy management system for an electric autonomous vehicle, with the energy management system comprising a battery, a controller comprising at least one processor and at least one non-transitory computer-readable medium including instructions, a pre-allocation input mechanism in electronic communication with the processor, a navigation module in electronic communication with the processor, and at least one autonomous input mechanism powered by the battery and in electronic communication with the processor, with the at least one autonomous input mechanism arranged to transmit an autonomous signal to the processor relating to dynamic conditions for autonomous operation of the vehicle, wherein the at least one autonomous input mechanism is one of a camera, lidar, or radar, the method comprising:

manipulating the pre-allocation input mechanism by an operator;

transmitting an input signal from the pre-allocation input mechanism to the processor relating to a travel destination for the vehicle;

receiving a wireless signal from a satellite network relating to a current location of the vehicle;

determining a route between the current location and the travel destination;

assigning at least one scenario along the route, wherein the at least one scenario is defined as a maneuver complexity, a route complexity, a road quality indication, a congestion awareness, a weather condition, and a lighting condition;

performing autonomous operation of the vehicle along the route; and selectively reducing usage of the at least one autonomous input mechanism to reduce power consumption with the battery during autonomous operation of the vehicle while operating along the route in the at least one scenario based upon need of the autonomous signal along the route to autonomously operate the vehicle based on the maneuver complexity, the route complexity, the road quality indication, the congestion awareness, the weather condition, or the lighting condition.

10. The method of claim 9, wherein reducing usage to the at least one autonomous input mechanism includes reducing a resolution, a field of view, and a frames per second of the camera, and reducing a range/signal strength, a field of view, and a cycle time of the radar and/or the lidar.

11. The method of claim 10, wherein the at least one scenario is defined along a portion of the route.

12. The method of claim 11, wherein the at least one scenario is defined by driving conditions embedded within the wireless signal from the satellite network.

13. The method of claim 9, wherein reducing usage to the at least one autonomous input mechanism is further defined as reducing power to the at least one autonomous input mechanism with the battery because the at least one autonomous input mechanism is not necessary for autonomous operation based on the driving conditions within the at least one scenario.

14. The method of claim 9, wherein the at least one autonomous input mechanism is defined as a plurality of autonomous input mechanisms and the at least one scenario is further defined as a plurality of scenarios along the route, with the autonomous input mechanisms configured to individually be powered off during one or more of the scenarios.

15. The method of claim 9, further comprising selectively powering or tuning the usage of the navigation module with the battery during autonomous operation of the vehicle based upon need of the wireless signal along the route to conserve energy in the battery.

16. The method of claim 9, further comprising overriding reducing power to the at least one autonomous input mechanism with the battery by an input from at least one of the operator and a remote assistance network.

17. A method of operating an energy management system for an electric autonomous vehicle, with the energy management system comprising a battery, a controller comprising at least one processor and at least one non-transitory computer-readable medium including instructions, a pre-allocation input mechanism in electronic communication with the processor, a navigation module in electronic communication with the processor, and a plurality of autonomous input mechanisms powered by the battery and in electronic communication with the processor, with the plurality of autonomous input mechanisms arranged to each transmit an autonomous signal to the processor relating to dynamic conditions for autonomous operation of the vehicle, wherein the plurality of autonomous input mechanisms includes at least one camera and at least one lidar or radar, the method comprising:

manipulating the pre-allocation input mechanism by an operator;

transmitting an input signal from the pre-allocation input mechanism to the processor relating to a travel destination for the vehicle;

receiving a wireless signal from a satellite network relating to a current location of the vehicle;

determining a route between the current location and the travel destination;

assigning at least one scenario along the route, wherein the at least one scenario is defined as a maneuver complexity, a route complexity, a road quality indication, a congestion awareness, a weather condition, and a lighting condition;

performing autonomous operation of the vehicle along the route;

selectively reducing usage of the plurality of autonomous input mechanisms to reduce power consumption with the battery during autonomous operation of the vehicle while operating along the route in the at least one scenario based upon need of the autonomous signal along the route to autonomously operate the vehicle based on the maneuver complexity, the route complexity, the road quality indication, the congestion awareness, the weather condition, or the lighting condition, wherein reducing usage to the plurality of autonomous input mechanisms includes reducing a resolution, a field of view, and a frames per second of the camera, and reducing a range/signal strength, a field of view, and a cycle time of the radar and/or the lidar; and overriding reducing usage of the plurality of autonomous input mechanisms by an input from at least one of the operator and a remote assistance network.

\* \* \* \* \*